US008676938B2

(12) United States Patent
Hitomi et al.

(10) Patent No.: US 8,676,938 B2
(45) Date of Patent: Mar. 18, 2014

(54) LOCAL STREAMING PROXY SERVER

(75) Inventors: Arthur S. Hitomi, Huntington Beach, CA (US); Osman Kent, Surrey (GB)

(73) Assignee: Numecent Holdings, Inc., Irvine, CA (US)

( * ) Notice: Subject to any disclaimer, the term of this patent is extended or adjusted under 35 U.S.C. 154(b) by 66 days.

(21) Appl. No.: 13/536,585

(22) Filed: Jun. 28, 2012

(65) Prior Publication Data

US 2013/0007227 A1 Jan. 3, 2013

Related U.S. Application Data

(60) Provisional application No. 61/502,258, filed on Jun. 28, 2011.

(51) Int. Cl.
*G06F 15/16* (2006.01)

(52) U.S. Cl.
USPC .......................... 709/219; 709/203; 709/217

(58) Field of Classification Search
CPC . G06F 11/1458; H04L 12/4641; H04L 29/06; H04L 67/02; H04L 67/34; H04L 67/142
USPC .......... 709/202, 203, 219, 224, 229; 707/770; 717/128; 719/310, 312
See application file for complete search history.

(56) References Cited

U.S. PATENT DOCUMENTS

| 6,343,313 | B1 | 1/2002 | Salesky et al. | |
| 6,886,169 | B2 * | 4/2005 | Wei | 709/219 |
| 6,917,963 | B1 * | 7/2005 | Hipp et al. | 709/229 |
| 7,210,147 | B1 * | 4/2007 | Hipp et al. | 719/312 |
| 8,117,600 | B1 * | 2/2012 | Roeck et al. | 717/128 |
| 2001/0034736 | A1 | 10/2001 | Eylon et al. | |
| 2003/0140089 | A1 * | 7/2003 | Hines et al. | 709/202 |
| 2004/0024845 | A1 | 2/2004 | Fishhaut et al. | |
| 2005/0198647 | A1 * | 9/2005 | Hipp et al. | 719/310 |
| 2007/0083645 | A1 * | 4/2007 | Roeck et al. | 709/224 |
| 2008/0163202 | A1 | 7/2008 | Kembel et al. | |
| 2009/0203368 | A1 | 8/2009 | Marsyla et al. | |
| 2009/0204711 | A1 | 8/2009 | Binyamin et al. | |
| 2010/0070526 | A1 * | 3/2010 | Matias | 707/770 |
| 2010/0250670 | A1 * | 9/2010 | Wei | 709/203 |

OTHER PUBLICATIONS

Ahlund, "An Approach Toward User-Centric Application Mobility," Master's Thesis in Computing Science, Umea University, Umea, Sweden, Aug. 28, 2009 [retrieved online at http://www8.cs.umu.se/education/examina/Rapporter/AndreasAhlund.pdf on Apr. 22, 2013].
International Application No. PCT/US2013/022295, International Search Report and Written Opinion mailed Apr. 15, 2013.

* cited by examiner

*Primary Examiner* — Quang N Nguyen
(74) *Attorney, Agent, or Firm* — Sheppard, Mullin, Richter & Hampton LLP

(57) ABSTRACT

A local application streaming proxy can create a virtual image of storage media, which allows cloud operators to rapidly deliver applications, or deliver any operating system remotely, while providing better security, network utilization, low power requirements, and consistent performance for streamed applications and operating systems. A station using its WiFi/LAN provides QoS guarantees (or priority) for application streaming network communications to create a consistent user experience regardless of other application bandwidth utilization. "HTTP demand paging" is also possible.

17 Claims, 6 Drawing Sheets

LOCAL STREAMING PROXY SERVER

CROSS REFERENCE TO RELATED APPLICATIONS

This application claims priority to provisional application no. 61/502,258 filed Jun. 28, 2011, entitled "Streaming Proxy Server," which is incorporated by reference herein.

BACKGROUND

An area of ongoing research and development is application delivery to computing devices. One aspect of application delivery is speed. Current application delivery platforms enable a device to download an application, which takes as much time as is required to accomplish the download, followed by an installation time. When the application is delivered from a relatively remote source, additional issues arise.

Another aspect of application delivery is security. Not all application delivery platforms offer the same amount of security in application delivery, piracy prevention, or the like. Other aspects of application delivery include network utilization, reduced power requirements for devices to which applications are delivered (and potentially for devices from which applications are delivered), and application and operating system performance consistency.

Downloading and installing an application is a simple way to obtain performance consistency, but this technique has other shortcomings. For example, there is often no effective piracy prevention in the delivery mechanism (though there can be piracy prevention through other techniques). This technique also means the device onto which the application is delivered must be capable of storing the application and running the application with sufficient speed such that users are not bothered by the performance. Network utilization is also limited to controlling the download, which essentially only impacts download times for a device without necessarily enabling load balancing to improve performance of all devices. These weaknesses with standard download/install have led to continuing research into virtual application delivery solutions.

SUMMARY

The following embodiments and aspects thereof are described and illustrated in conjunction with systems, tools, and methods that are meant to be exemplary and illustrative, not necessarily limiting in scope. In various embodiments, one or more of the above-described problems have been addressed, while other embodiments are directed to other improvements.

The proxy can create a virtual image of storage media, which allows cloud operators to rapidly deliver applications, or deliver any operating system remotely, while providing better security, network utilization, low power requirements, and consistent performance for streamed applications and operating systems. A station using its WiFi/LAN provides QoS guarantees (or priority) for application streaming network communications to create a consistent user experience regardless of other application bandwidth utilization. "HTTP demand paging" is also possible.

A proof of concept running on a wireless netbook delivering virtual machines using techniques described in this paper has been impressive—for VM running WinTPC (a stripped Win7 OS), startup times very close to machines with the OS natively installed have been achieved.

The foregoing examples of the related art and limitations related therewith are intended to be illustrative and not exclusive. For example, wireless clients may use different protocols other than WiFi (or IEEE 802.11), potentially including protocols that have not yet been developed. However, problems associated with performance may persist. Other limitations of the relevant art will become apparent to those of skill in the art upon a reading of the specification and a study of the drawings.

DETAILED DESCRIPTION

Figure 1:
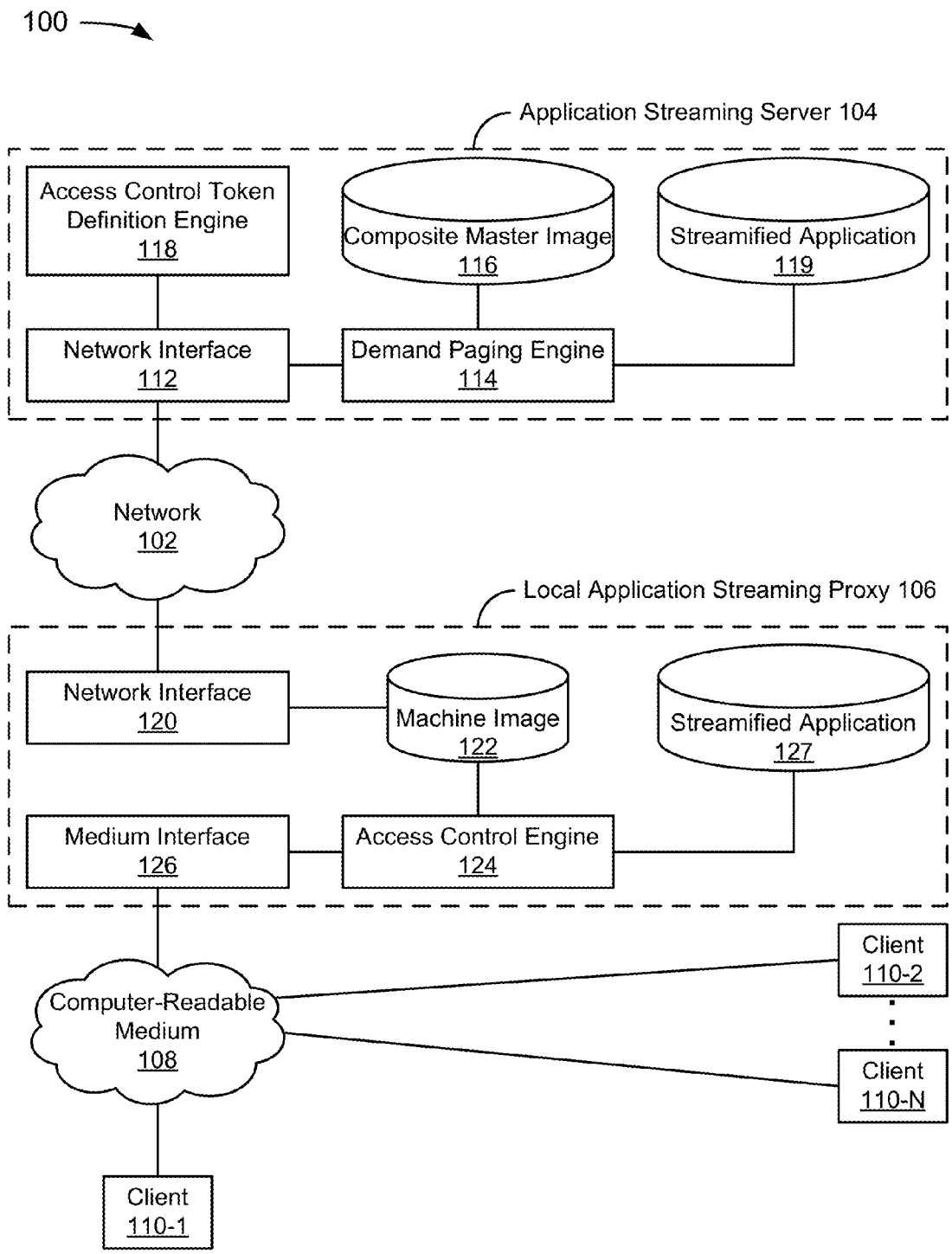
FIG. 1 depicts a diagram of an example of an application streaming system with a local proxy.

FIG. 1 depicts a diagram 100 of an example of an application streaming system with a local proxy. In the example of FIG. 1, the diagram 100 includes a network 102, an application streaming server 104, a local application streaming proxy 106, a computer-readable medium 108, and clients 110-1 to 110-N (collectively referred to as clients 110).

In the example of FIG. 1, the network 102 may be practically any type of communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, the network 102 can include, for example, a wide area network (WAN), metropolitan area network (MAN), campus area network (CAN), or local area network (LAN), but the network 102 could at least theoretically be of any size or characterized in some other fashion. Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet. The example of FIG. 1 is intended to illustrate a network 102 that may or may not include more than one private network.

In the example of FIG. 1, the application streaming server 104 is coupled to the network 102. In the example of FIG. 1, the application streaming server 104 provides administrative and license management in coordination with a local application streaming proxy server. In a specific implementation, the application streaming server 104 is implemented as a NUMECENT™/APPROXY™ portal or gateway. As such, the application streaming server 104 can in alternative implementations be referred to as an "application streaming portal" or an "application streaming gateway."

The application streaming server 104, and more generally any device connected to a network, can be referred to as "on"

the network. For illustrative purposes, the application streaming server 104 is described in this example as serving content. Accordingly, in this example, the application streaming server 104 can be referred to as a content server. A web server, which is one type of content server, is typically at least one computer system that operates as a server computer system and is configured to operate with the protocols of the World Wide Web and is coupled to the Internet. Unless context dictates otherwise, a server as used in this paper includes at least a portion of a computer system running server software.

A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor.

The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

In the example of FIG. 1, the application streaming server 104 includes a network interface 112, a demand paging engine 114, a composite master image datastore 116, and an access control token definition engine 118. The application streaming server 104 can communicate using a network transport and message service (NTS). The network interface 112 can be implemented as an applicable known or convenient interface sufficient to enable the application streaming server 104 communication with or through the network 102.

The demand paging engine 114 is responsible for streaming an application using a demand paging technique. As used in this paper, an engine includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The composite master image datastore 116 includes one or more images that can be provided to the clients 110. The images include snapshots of applications on top of a machine. Thus, the images can be referred to as "application snapshots." Application snapshots can be made portable across at least some machines (or OSs if the application is sufficiently neutral, such as Java). A snapshot engine (not shown) can take an initial snapshot of an environment before the application is run (unless the snapshot engine has access to an installation file from which an application install can be deconstructed, such as Android) then after installation in the cloud. The resultant package, the application snapshot, can be invoked on a device or in the cloud using the environment snapshot, if needed.

A datastore can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

The demand paging engine 114 can deliver partial or full images from the composite master image datastore 116 to the local application streaming proxy 106.

The access control token definition engine 118 creates tokens to define access policies of the clients 110. The access control tokens are passed to the local application streaming proxy 106 and clients 110. In a specific implementation, the access control includes digital rights management (DRM) functionality.

The local application streaming proxy 106 is controlled by the application streaming server 104, which acts as a master server, running remotely (e.g. in the Cloud). The application streaming server 104 may or may not bypass the local application streaming proxy 106, but in any case delivers software applications from the application streaming server 104, which can be referred to as a central server relative to a plurality of proxies, if applicable, and to a target machine of the clients 110, where the software is executed. In certain implementations, the local application streaming proxy 106 is expected to serve one target at a time. The software application delivered from the master server could be partials (e.g. prefetch/jumpstart) to help reduce a storage footprint on the local application streaming proxy 106 and/or the clients 110, and the rest could be streamed from the master through the local application streaming proxy 106.

In a specific implementation, the local application streaming proxy 106 is part of a JUKEBOX SERVER™ system. The local application streaming proxy 106 can be implemented on a smartphone (e.g., an Android) so that applications can be streamed from the smartphone proxy to the clients 110. The smartphone can stream using local WiFi or other applicable technology. In a specific implementation, the smartphone 104 can serve 5 or 6 users, but the number of users that can be supported will vary depending upon many factors. Advantageously, the smartphone is an intelligent or active (managed) proxy to aid in unreliable QoS (e.g. intermittent) and offline connectivity environments. The device can be referred to as a local cloud device. It is not necessary for the implementation to be a smartphone to obtain this advantage (e.g. router, access point, proxy, etc. are also applicable). So the smartphone can more generally be referred to as a station in IEEE 802.11 parlance.

In a specific implementation, it is possible to accomplish streaming virtual machines or machine images onto the proxy (full or partial) and then onto the target, which could also be accomplished with the above approach, but with some different details and requirements (though these could be combinable). This allows laptops (or desktops/tablets) to launch directly off of the proxy device, reducing space requirements on the target, which improves security. In a specific implementation, writes are imaged back up to the server.

Advantageously, the local application streaming proxy 106 can create a virtual image of storage media, which allows cloud operators to rapidly deliver applications, or deliver any operating system remotely, while providing better security, network utilization, low power requirements, and consistent performance for streamed applications and operating systems. A station using its WiFi/LAN provides QoS guarantees (or priority) for application streaming network communications to create a consistent user experience regardless of other application bandwidth utilization. "HTTP demand paging" is also possible.

In the example of FIG. 1, the local application streaming proxy 106 includes a network interface 120, a machine image datastore 122, an access control engine 124, and a medium interface 126. The network interface 120 can be implemented as an applicable known or convenient interface sufficient to enable the local application streaming proxy 106 communication with or through the network 102.

The machine image datastore 122 includes one or more application snapshots. The application snapshots are a subset of the images stored in the composite master image datastore 116 of the application streaming server 104. In an implementation that includes multiple local application streaming proxies, different proxies may or may not have different subsets of the images of the composite master image datastore 116. The differences can depend, for example, upon the needs of clients locally served by a particular proxy.

The access control engine 124 enforces access control policy at the clients 110 and, potentially, at the local application streaming proxy 106. The access control engine 124 provides one or more images from the machine image datastore 122 to the clients 110. In a specific implementation, the access control engine 124 uses DRM to authenticate and regulate access of a target machine of the clients 110. The access control engine 124 may prevent provisioning of a snapshot to a client if the client is in violation of access control policy. In a specific implementation, the access control engine 124 can instruct a client to wipe its cache or delete relevant portions of memory. Access control policy is defined by access control tokens that the local application streaming proxy 106 received from the application streaming server 104. Advantageously, the access control engine 124 can ensure access control policies are enforced at the clients 110 even if the local application streaming proxy 106 is offline (i.e., not on the network 102). This facilitates the use of "offlining" in instances where it would not otherwise be possible.

The medium interface 126 is coupled to the computer-readable medium 108. The depiction of the medium interface 126 and the network interface 120 is intended to illustrate one connection is to the application streaming server 104 and another connection is to the clients 110. Where the computer-readable medium 108 is implemented as a LAN, the medium interface 126 can be referred to as a LAN interface 126. Where the computer-readable medium 108 is implemented as a wireless LAN (WLAN), the medium interface 126 can be referred to as a wireless network interface or a radio. Where the computer-readable medium 108 is on a device on which the local application streaming proxy 106 and one or more of the clients 110 also reside, the medium interface 126 can include a bus interface or some other interface (that may or may not normally be referred to as an "interface") that ultimately enables the local application streaming proxy 106 communication on or through the computer-readable medium 108.

The computer-readable medium 108 is coupled to the local application streaming proxy 106 and the clients 110. The computer-readable medium 108 can be implemented as a wired or wireless medium. In a wireless communications context, the local application streaming proxy 106 and the clients 110 can be referred to as stations. A station, as used in this paper, may be referred to as a device with a media access control (MAC) address and a physical layer (PHY) interface to a wireless medium that complies with the IEEE 802.11 standard. Thus, for example, the stations 106 and a wireless access point (WAP) with which the stations 106 associate can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

The clients 110 receive streamed application data from the application streaming server 104. Streamed application data is a form of content. Thus, in this example, the server-client relationship between the application streaming server 104 and the clients 110 is that of content server to content consumer. Also, the clients 110 can be referred to as "content receiving clients" or "application streaming clients." A device that includes a client 110-1 can also include a client of some other server or include a server for some other client. For example, in a wireless context, the device can include a wireless client and be associated with a wireless network, such as a WLAN.

In a specific implementation, the local application streaming proxy 106 is implemented on a device that is different from devices on which the clients 110 are implemented. Alternatively, the local application streaming proxy 106 and one or more of the clients 110 are implemented on the same device.

Figure 2:
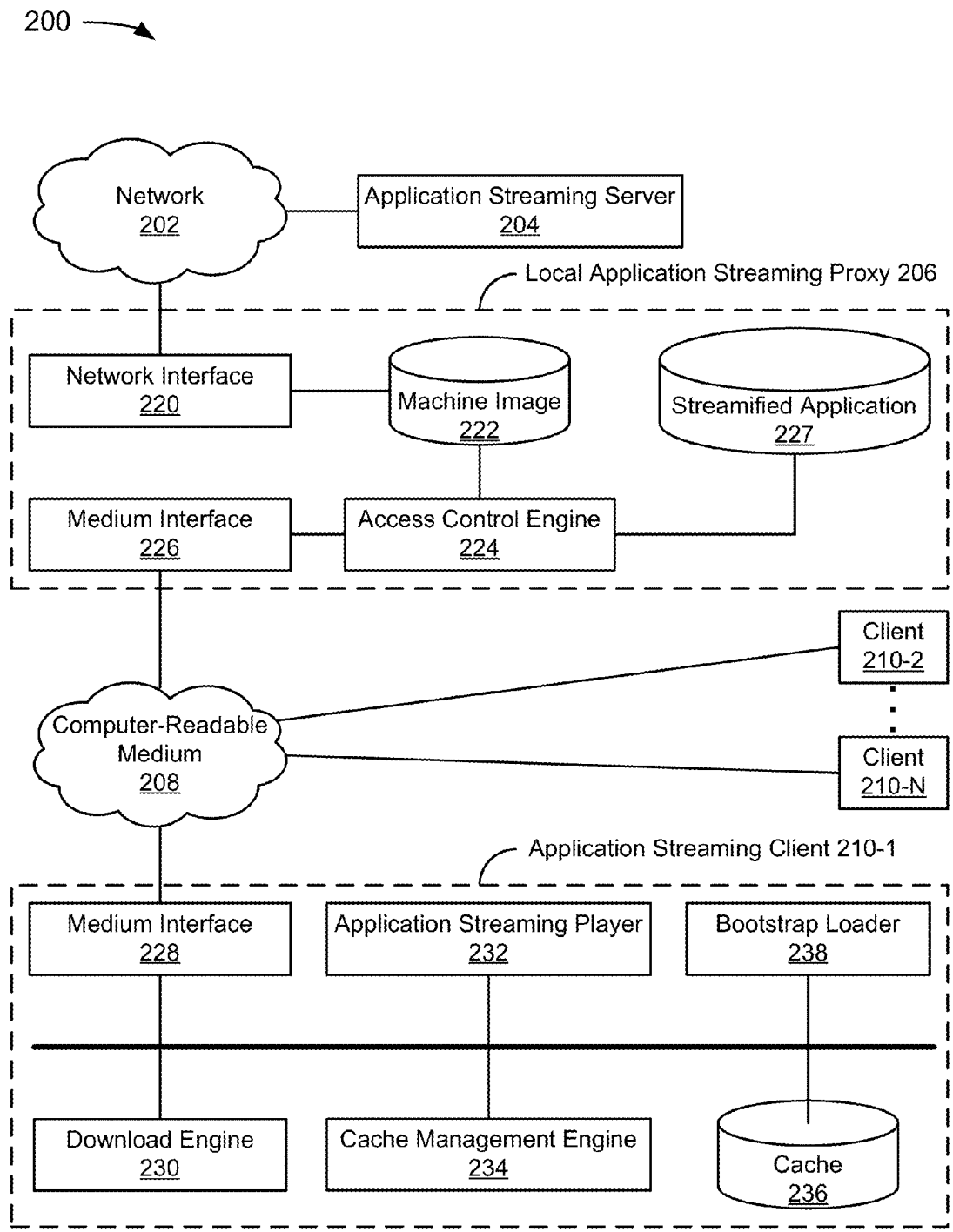
FIG. 2 depicts a diagram of an example of an application streaming system with a local proxy.

FIG. 2 depicts a diagram 200 of an example of an application streaming system with a local proxy. In the example of FIG. 2, the diagram 200 includes a network 202, an application streaming server 204, a local application streaming proxy 206, a computer-readable medium 208, and clients 210-1 to 210-N (collectively referred to as clients 210). The network 202, application streaming server 204, local application streaming proxy 206, and computer-readable medium 208 can be implemented as described for the network 102, the application streaming server 104, the local application streaming proxy 106, and the computer-readable medium 108 of FIG. 1, though not necessarily exactly as described.

In the example of FIG. 2, the application streaming client 210-1 includes a medium interface 228, a download engine 230, an application streaming player 232, a cache management engine 234, a cache 236, and a bootstrap loader 238. The application streaming client 210-1 can also include a file system driver (FSD) (not shown). The medium interface 228 can be implemented as an applicable known or convenient interface sufficient to enable the client 210-1 communication with or through the computer-readable medium 208.

The download engine 230 obtains an application snapshot from the application streaming server 204 or the local application streaming proxy 206. The application snapshot informs the application streaming client 210-1 of what characteristics the application would have if installed on the application streaming client 210-1. This enables the applications streaming client 210-1 to act as if the applicable application is installed on the application streaming client 210-1 even when it is not. The download engine 230 can also obtain jumpstart partials, which include portions of the application that have been determined to cause potential delay if not downloaded before the start of the streamed application (e.g., portions of the application that are inevitably run during an early part of an application's execution). The download engine 230 can include a content prefetcher that obtains portions of the streamed application in anticipation of needing the portions soon, or at least at some point in the future. The sensitivity of the content prefetcher (i.e., the probability that a portion of an application will be considered "likely" to be used soon or at least at some point in the future) can be configurable or unconfigurable, depending upon the implementation.

The application streaming player 232 runs the streamed application as if it were installed on the application streaming client 210-1. As used in this paper, installed is intended to mean "fully installed" such that executing the streamed application would not result in a system crash if an uninstalled portion of the application were accessed. As used in this paper, an application is intended to mean an executable (not simply data) program with at least one branch instruction. Due to the implementation of the downloaded application snapshot, the application streaming player 232 "thinks" that the application is installed on the machine. In addition, the application streaming player 232 can capture requests for portions of the streamed application (or data) that is not locally available and instruct the download engine 230 to obtain the portions of the streamed application that are not locally available.

In a specific implementation, the application streaming player 232 implements an access control policy from the application streaming server 204 and/or the local application streaming proxy 206. The application streaming player 232 can enforce, e.g., DRM policies. The application streaming player 232 can use DRM when communicating with the proxy or master.

The cache management engine 234 manages the cache 236 (which can be considered a datastore) to enable the application streaming player 232 to satisfy requests using portions of the streamed application in the cache 236. The download engine 230 can provide additional portions of the streamed application to the cache 236 over time. The cache management engine 234 can clear portions of the cache 236 in accordance with a cache management protocol (e.g., older entries can be deleted before newer entries).

The bootstrap loader 238 boots directly off of the application streaming proxy 106. One way to view this is that the proxy (e.g., smartphone) comes with an intelligent, secured, cloud tethered virtual hard drive that you can bind to a computing device. In a specific implementation, the bootstrap loader 238 implements a preboot execution environment (PXE). The increasing popularity of client-side hypervisors will make this an even stronger use case.

Figure 3:
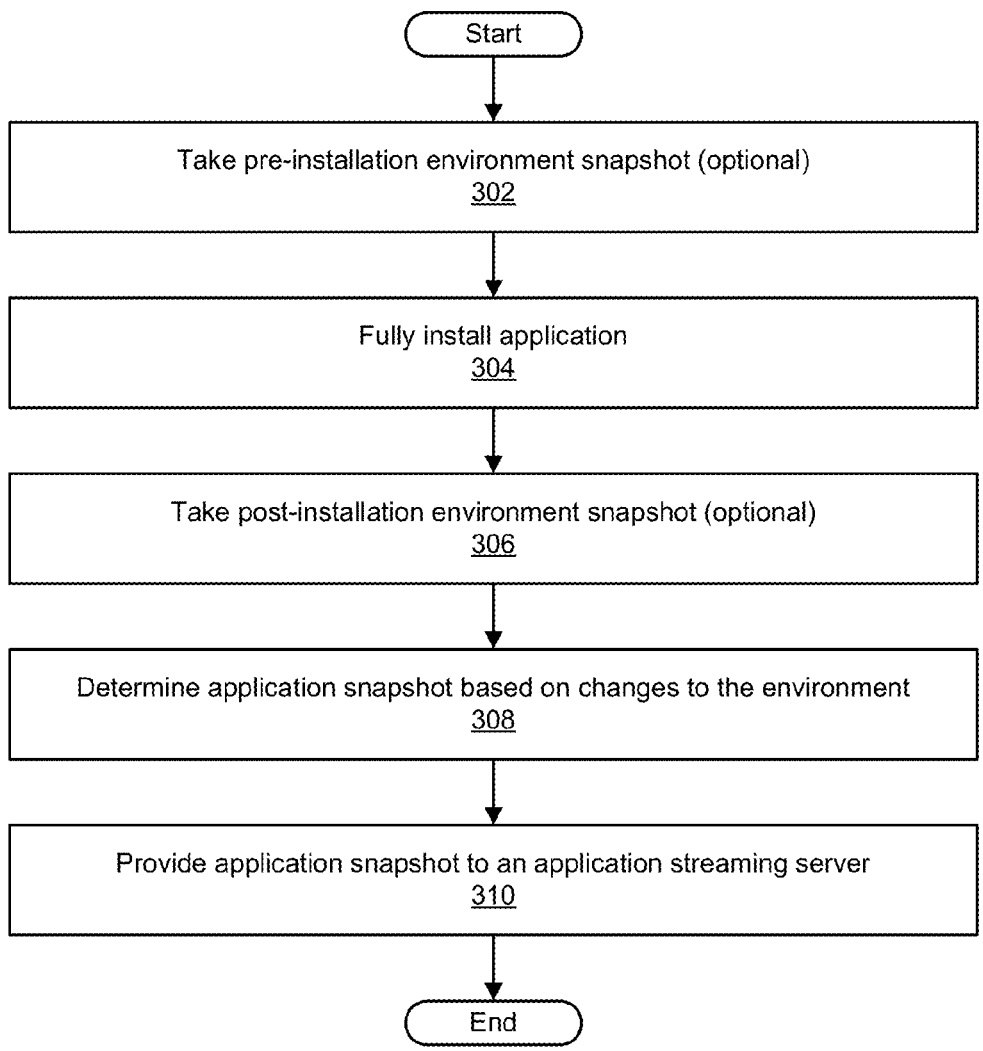
FIG. 3 depicts a flowchart of an example of a method for local application streaming.

FIG. 3 depicts a flowchart 300 of an example of a method for local application streaming. In the example of FIG. 3, the flowchart 300 starts at module 302 with taking a pre-installation environment snapshot. Taking a pre-installation snapshot is optional in the sense that some environments include an adequate installation log that enables an engine to determine what changes an application made to a system when the application was installed.

In the example of FIG. 3, the flowchart 300 continues to module 304 with fully installing the application. Due to the nature of streaming, it is important to ensure that an application streaming content consumer not crash when a request for a file resource of the application is not present. Accordingly, a full installation is needed to create the application snapshot, even if the application is never fully streamed in its entirety.

In the example of FIG. 3, the flowchart 300 continues to module 306 with taking a post-installation environment snapshot. Again, taking the post-installation snapshot is optional in the sense that some environments include an adequate installation log.

In the example of FIG. 3, the flowchart 300 continues to module 308 with determining application snapshot based on changes to the environment. If there is an adequate installation file, the application snapshot can be determined from the file. If not, the application snapshot can be determined at least in part from the differences in a pre- and post-installation environment snapshot. In some cases, additional processing may be required to create an application snapshot due to deficiencies in some computer self-monitoring engines.

In the example of FIG. 3, the flowchart 300 continues to module 310 with providing application snapshot to application streaming server. The application streaming server can provide the application snapshot to a client with a compatible configuration to enable the client to request file resources in the normal course of the on-client (local) execution of a streaming application even if the file resources are not on the client.

Figure 4:
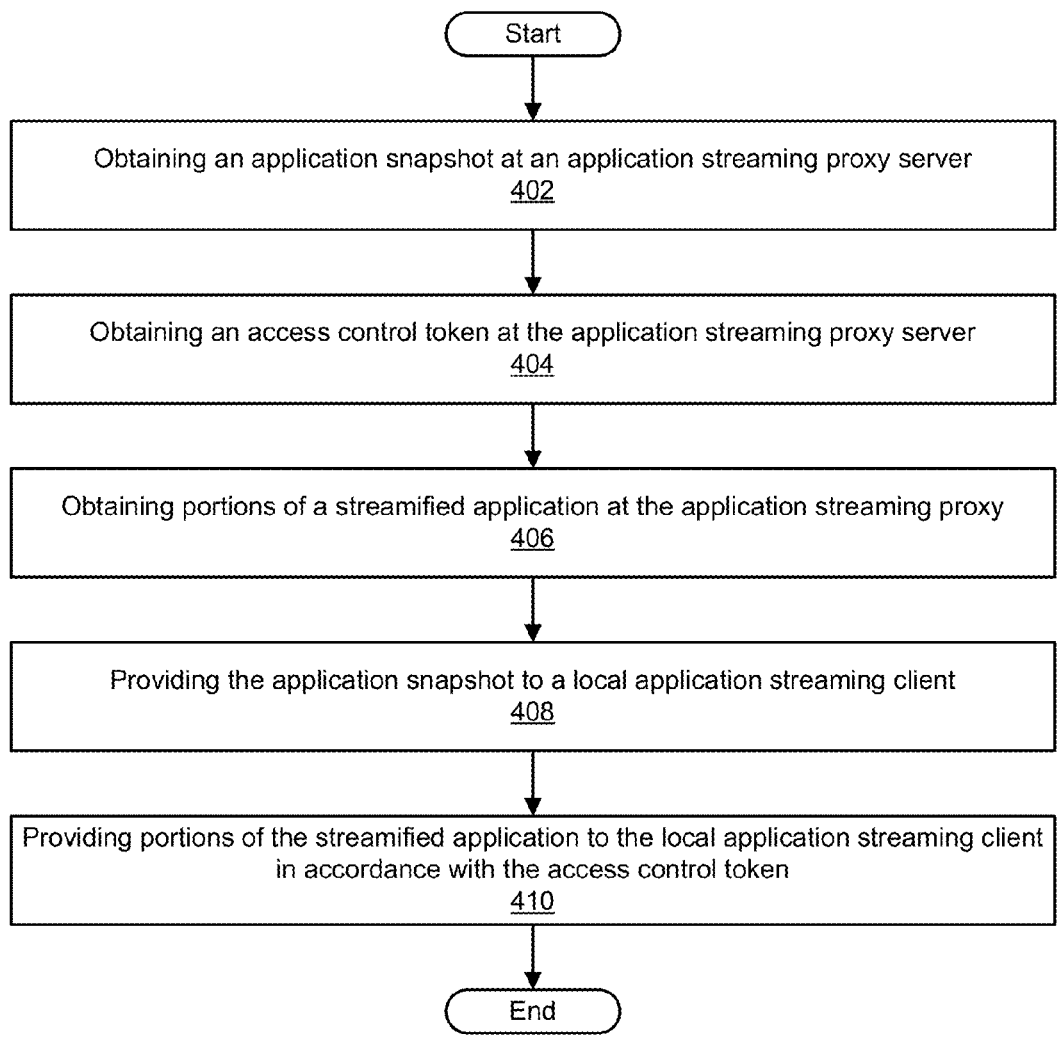
FIG. 4 depicts a flowchart of an example of a method of local proxy application streaming.

FIG. 4 depicts a flowchart 400 of an example of a method of local proxy application streaming. In the example of FIG. 4, the flowchart 400 starts at module 402 with obtaining an application snapshot at an application streaming proxy server. The application snapshot could be received from an application snapshot server, which can conceptually be considered part of a master application streaming server. In some implementations, the application snapshot could be provided through some other input device, such as removable storage.

In the example of FIG. 4, the flowchart 400 continues to module 404 with obtaining an access control token at the application streaming proxy server. The access control token can be received from an access control token server, which can conceptually be considered part of the master application streaming server. In some implementations, the access control token could be provided through some other input device, such as removable storage and/or defined or modified at the local application streaming proxy. Depending upon the implementation, it may be undesirable to allow the proxy to define or modify access control tokens due to security, DRM, or other risk concerns.

In the example of FIG. 4, the flowchart 400 continues to module 406 with obtaining portions of a streamified application at the application streaming proxy. A streamified application is broken into portions (e.g., blocks, chunks, pages, etc.) that are streamed on a per-portion basis to an application streaming client. A master application streaming server can provide a subset of the portions to the application streaming proxy. The subset can include one or more jumpstart portions, one or more prefetch portions, and/or one or more of the other portions of the streamified application. In a specific implementation, the application streaming proxy can be allowed to store all of the portions of a streamified application. In another specific implementation, the application streaming proxy can be prevented from storing all of the portions of the streamified application to make piracy more difficult (by not making all portions of the streamified application readily available in a single location), to conserve resources at the proxy, or for other reasons. In a specific implementation, the jumpstart portion(s) of the streamified application is not stored at the proxy.

In the example of FIG. 4, the flowchart 400 continues to module 408 with providing the application snapshot to a local application streaming client. Application snapshots may or may not be appropriate for all operating systems, but can typically be appropriate for a plurality of computers without modification. The proxy may or may not need to determine the characteristics of the client before providing the application snapshot to ensure a proper application snapshot is provided. The local application streaming client can use the application snapshot to request file resources identifiable from the application snapshot that are not presently on the client (an application streaming player will request the applicable streamified portions to satisfy the requests).

In the example of FIG. 4, the flowchart 400 continues to module 410 with providing portions of the streamified application to the local application streaming client in accordance with the access control token. The access control token is associated with an access control policy, such as DRM, that is set at a server. An advantage of using the access control token at the proxy is that the proxy can be unconnected from the server (operating in offline mode) and still enforce access control policy.

Figure 5:
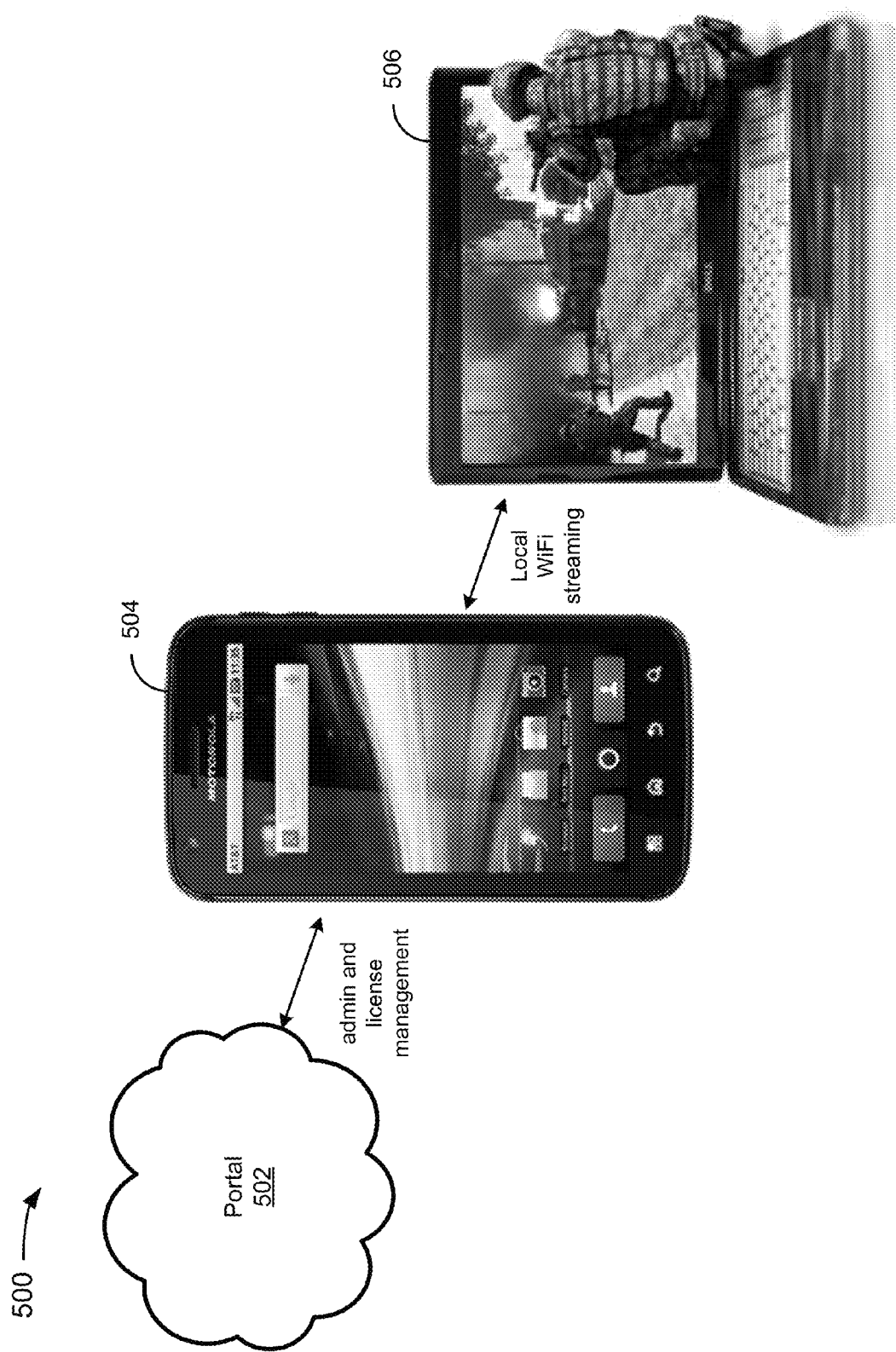
FIG. 5 depicts a diagram of an example of a system with a local proxy smartphone.

FIG. 5 depicts a diagram 500 of an example of a system with a local proxy smartphone. In the example of FIG. 5, the system includes a portal 502, a smartphone proxy 504 and an end-user device 506. In operation, the portal 502 sends portions of a streamified application to the smartphone proxy 504. In a specific implementation, the portal 502 can perform administrative and license management with the smartphone proxy 504 over a 3G/4G or WiFi network. Advantageously, the smartphone becomes a microappliance providing a user's favorite apps in-pocket, with the security smartphones offer. In a specific implementation, the smartphone proxy 504 can perform application streaming to the end user device 506 over a local WiFi channel. Advantageously, using local WiFi provides control over transmissions, which can improve performance not only at the end-user device 506, but also for other users on the WiFi network. The end-user device 506 receives streamed applications (games or enterprise) from the smartphone proxy 504. No installation is required, the applications can be provided on demand, and the end-user device 506 has the security end-user computer systems offer.

Figure 6:
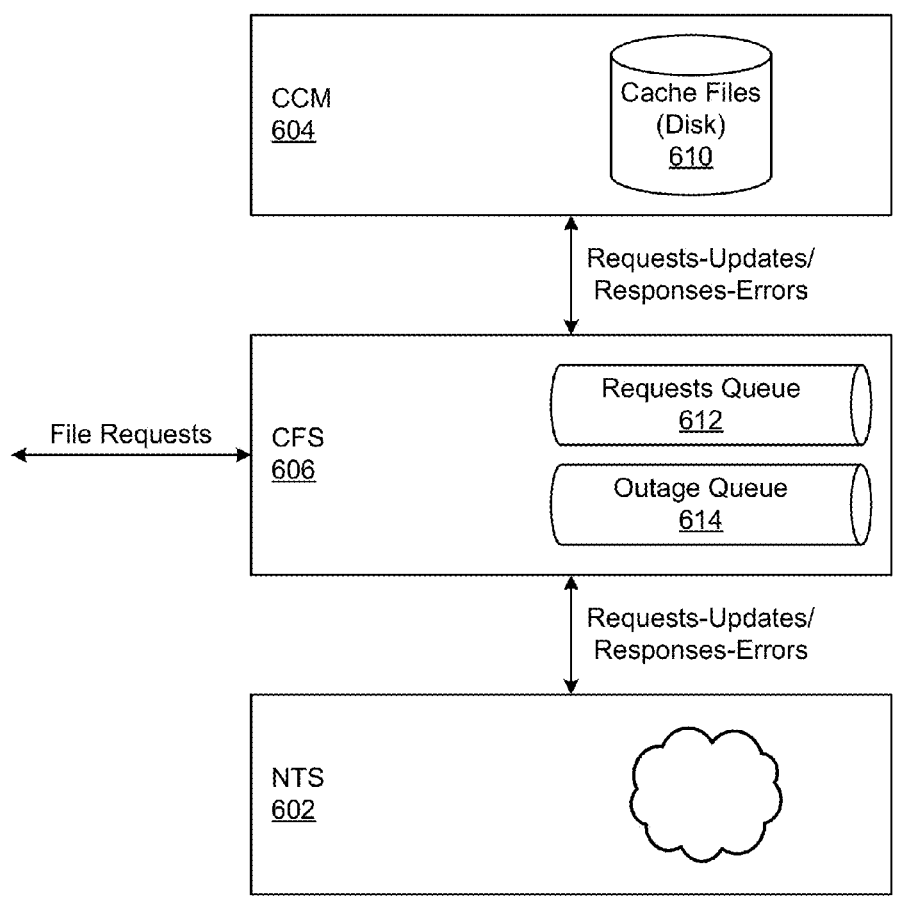
FIG. 6 depicts a diagram of an example of a system for an application streaming system.

FIG. 6 depicts a diagram 600 of an example of a system for an application streaming system. In the example of FIG. 6, the system includes a network and transport message structure (NTS) 602, a cache manager (CCM) 604, and a content fetcher system (CFS) 606. The system can also include a file system directory (FSD) and bootstrapping engine (not shown). In a specific implementation, for an application streaming client to receive streamed applications, the client needs a storage device and interface, a network HTTP stack, tread support, and encryption & compression libraries. In the example of FIG. 6, the NTS 602 and the CFS 606 communicate requests, updates, responses, and errors with one another.

In the example of FIG. 6, the CCM 604 includes a cache files datastore 610. Portions of a streamified application can be stored in the cache files datastore 610 in accordance with cache management policy. The CCM 604 and the CFS 606 communicate requests, updates, responses, and errors with one another.

In the example of FIG. 6, the CFS 606 includes a requests queue 612 and an outage queue 614. The requests provided to the CFS 606 by the NTS 602 or the CCM 604 are enqueued in the requests queue 612 for transmission to an application streaming server, such as a local application streaming proxy.

As used herein, a wireless network refers to any type of wireless network, including but not limited to a structured network or an ad hoc network. Data on a wireless network is often encrypted. However, data may also be sent in the clear, if desired.

As used herein, the term "embodiment" means an embodiment that serves to illustrate by way of example but not limitation. The techniques described in the preceding text and figures can be mixed and matched as circumstances demand to produce alternative embodiments.

We claim:

1. A method comprising:
obtaining an application snapshot at an application streaming proxy server;
obtaining an access control token at the application streaming proxy server;
obtaining portions of a streamified application at the application streaming proxy server;
providing the application snapshot to a local application streaming client, wherein the application snapshot enables the local application streaming client to request file resources that are not on the local application streaming client;
streaming the portions of the streamified application to the local application streaming client in accordance with the access control token;
wherein the application snapshot includes a predicted difference between an operating environment at the local application streaming client and an operating environment that would be at the local application streaming client if the streamified application were installed at the local application streaming client.

2. The method of claim 1, wherein the application streaming proxy server obtains the application snapshot from an application snapshot server.

3. The method of claim 1, wherein the application streaming proxy server obtains the portions of the streamified application from a master application streaming server.

4. The method of claim 1, further comprising obtaining the portions of the streamified application from an application streaming server over a 3G/4G network.

5. The method of claim 1, further comprising uploading a jumpstart portion of the streamified application to the local application streaming client, wherein the jumpstart portion enables the local application streaming client to begin executing the streamified application.

6. The method of claim 1, further comprising streaming a prefetch portion of the streamified application to the local application streaming client, wherein the prefetch portion is predicted to be needed at some point in the execution of the streamified application.

7. The method of claim 1, further comprising streaming the portions of the streamified application to the local application streaming client over a wireless local area network.

8. The method of claim 1, further comprising:
providing requested portions of the streamified application to the local application streaming client when the requested portions are available at the application streaming proxy server;
forwarding the request for the requested portions of the streamified application to a master application streaming server when the requested portions are unavailable at the application streaming proxy server.

9. A system comprising:
at least one processor configured to execute computer executable instructions stored in at least one memory to perform a method comprising:
obtaining an application snapshot at an application streaming proxy server;
obtaining an access control token at the application streaming proxy server;
obtaining portions of a streamified application at the application streaming proxy server;
providing the application snapshot to a local application streaming client, wherein the application snapshot enables the local application streaming client to request file resources that are not on the local application streaming client;
streaming the portions of the streamified application to the local application streaming client in accordance with the access control token;
wherein the application snapshot includes a predicted difference between an operating environment at the local application streaming client and an operating environment that would be at the local application streaming client if the streamified application were installed at the local application streaming client.

10. A method comprising:
obtaining an access control token at an application streaming proxy server;
obtaining portions of a streamified application at the application streaming proxy server;
streaming the portions of the streamified application to the local application streaming client in accordance with the access control token, wherein the application streaming proxy server uses the access control token to enforce access control policy at the local application streaming client, wherein the application streaming proxy server is operable in an offline mode in which the application streaming proxy server continues to enforce the access control policy while unconnected from a master application streaming server;
uploading a jumpstart portion of the streamified application to the local application streaming client, wherein the jumpstart portion enables the local application streaming client to begin executing the streamified application.

11. The method of claim 10, wherein the application streaming proxy server obtains the access control token from an access control server.

12. The method of claim 10, wherein the application streaming proxy server obtains the portions of the streamified application from a master application streaming server.

13. The method of claim 10, further comprising obtaining the portions of the streamified application from an application streaming server over a 3G/4G network.

14. The method of claim 10, further comprising streaming a prefetch portion of the streamified application to the local application streaming client, wherein the prefetch portion is predicted to be needed at some point in the execution of the streamified application.

15. The method of claim 10, further comprising streaming the portions of the streamified application to the local application streaming client over a wireless local area network.

16. The method of claim 10, further comprising:
providing requested portions of the streamified application to the local application streaming client when the requested portions are available at the application streaming proxy server;
forwarding the request for the requested portions of the streamified application to a master application streaming server when the requested portions are unavailable at the application streaming proxy server.

17. A system comprising:
at least one processor configured to execute computer executable instructions stored in at least one memory to perform a method comprising:
obtaining an access control token at an application streaming proxy server;
obtaining portions of a streamified application at the application streaming proxy server;
streaming the portions of the streamified application to the local application streaming client in accordance with the access control token, wherein the application streaming proxy server uses the access control token to enforce access control policy at the local application streaming client, wherein the application streaming proxy server is operable in an offline mode in which the application streaming proxy server continues to enforce the access control policy while unconnected from a master application streaming server;
uploading a jumpstart portion of the streamified application to the local application streaming client, wherein the jumpstart portion enables the local application streaming client to begin executing the streamified application.

\* \* \* \* \*